United States Patent
Dowel

(10) Patent No.: US 8,895,640 B2
(45) Date of Patent: *Nov. 25, 2014

(54) SEALING COMPOSITION

(71) Applicant: Terence Dowel, Ferntree Gully (AU)

(72) Inventor: Terence Dowel, Ferntree Gully (AU)

(73) Assignee: Trydel Research Pty Ltd, Ferntree Gully, Victoria (AU)

( * ) Notice: Subject to any disclaimer, the term of this patent is extended or adjusted under 35 U.S.C. 154(b) by 144 days.

This patent is subject to a terminal disclaimer.

(21) Appl. No.: 13/674,257

(22) Filed: Nov. 12, 2012

(65) Prior Publication Data

US 2013/0072601 A1    Mar. 21, 2013

Related U.S. Application Data

(63) Continuation-in-part of application No. 12/682,519, filed as application No. PCT/AU2008/001499 on Oct. 9, 2008, now Pat. No. 8,329,778.

(30) Foreign Application Priority Data

| Oct. 9, 2007 | (AU) | ............................... | 2007905526 |
| Oct. 19, 2007 | (AU) | ............................... | 2007905745 |
| Dec. 7, 2007 | (AU) | ............................... | 2007906682 |

(51) Int. Cl.
| B29C 73/00 | (2006.01) |
| C09D 133/02 | (2006.01) |
| C09D 189/00 | (2006.01) |
| C09D 199/00 | (2006.01) |
| C09D 101/28 | (2006.01) |
| C08L 93/04 | (2006.01) |
| C08L 33/02 | (2006.01) |
| C08L 1/28 | (2006.01) |
| C08L 5/00 | (2006.01) |
| C08L 99/00 | (2006.01) |

(52) U.S. Cl.
CPC .......... *C09D 133/02* (2013.01); *C09D 189/005* (2013.01); *C09D 199/00* (2013.01); *C09D 101/28* (2013.01); *C09D 189/00* (2013.01); *C08L 93/04* (2013.01); *C08L 33/02* (2013.01); *C08L 1/28* (2013.01); *C08L 1/284* (2013.01); *C08L 1/286* (2013.01); *C08L 5/00* (2013.01); *C08L 99/00* (2013.01)
USPC .......................................................... 523/166

(58) Field of Classification Search
CPC ..................................................... B29C 73/163
USPC ........................................................ 523/166
See application file for complete search history.

(56) References Cited

U.S. PATENT DOCUMENTS

| 2,827,098 | A | 3/1958 | Sernegen, et al. |
| 4,101,497 | A | 7/1978 | Charves et al. |
| 4,588,758 | A | 5/1986 | Jaspon |
| 8,329,778 | B2 * | 12/2012 | Dowel .......................... 523/166 |
| 2005/0228083 | A1 | 10/2005 | Fogal |

FOREIGN PATENT DOCUMENTS

| DE | 10044551 A1 | 3/2002 |
| EP | 0089889 A2 | 9/1983 |
| WO | WO96/05048 | 2/1996 |
| WO | WO2006/038824 | 4/2006 |

OTHER PUBLICATIONS

International Search Report dated Dec. 1, 2008, PCT/AU2008/001499.
International Preliminary Report dated Sep. 24, 2009, PCT/AU2008/001499; 3 pages.

* cited by examiner

*Primary Examiner* — Edward Cain
(74) *Attorney, Agent, or Firm* — Vedder Price P.C.

(57) ABSTRACT

A sealant composition for the sealing of a punctured tire including a liquid carrier, one or more viscosity and suspending agents, one or more fillers and sealants, and one or more polyacrylates.

6 Claims, No Drawings

SEALING COMPOSITION

FIELD OF THE INVENTION

The present invention relates, in general terms, to improved compositions for use in the sealing—as by repair—of a damaged inflatable article. More particularly, but not exclusively, the invention relates to improved compositions for use in the sealing—as by repair—of a damaged—as for example punctured—tire for a vehicle. The invention also relates to a method for the preparation of such compositions.

BACKGROUND OF THE INVENTION

The invention relates to an improvement in or modification of the sealant composition the subject of the present applicant's International (PCT) Application No. PCT/AU2007/001222.

A puncture can be a serious hazard associated with the use of inflatable load-carrying articles such as tires—whether such be on automobiles, trucks, motorcycles, bicycles, etc. When a puncture occurs with an automobile, for example, the traditional practice has been to replace the damaged/punctured tire with the spare, with such spare being intended to allow for use of the vehicle either only for a limited time and limited distance—to allow the driver to travel to a site where the damaged tire can be repaired and restored to the vehicle—or in the alternative to allow the vehicle to be driven without problems until such time as a replacement or repaired tire can be secured and installed.

There can be difficulties associated with, firstly, removal of a punctured tire and, secondly, location of the spare or a replacement tire on the vehicle. These difficulties can include the unavailability of the tooling needed to remove a damaged tire and replace such with the spare, and the actual physical effort associated with such tasks, not to mention potential risks/damage to the person effecting such a task. Furthermore, the situation has been known to arise where the spare tire may not be sufficiently inflated to be properly and safely usable.

In accordance with the prior art practices there have been employed, for purposes of introduction of a sealing composition into a punctured tire, an apparatus consisting of a pressurised container for the sealing composition which houses a liquefied gas—of any suitable type—as a pressure source. Such container includes, for purposes of dispensing the contents thereof, a valve or the like having associated or to be associated therewith an adaptor which allows for connection of the overall container to the tire valve. Such an adaptor may be of the screw-on type, or of any other known type. With such an arrangement the sealing composition is sprayed into the tire through the tire valve, the tire then being re-inflated by means of the propellant gas, which then allows the car to be driven.

In another known arrangement a sealing composition is housed within a compressible flask which is to be connected, via an adaptor of any known type, to the tire valve, with the valve insert or core having first been removed therefrom. With such an arrangement the sealing composition is sprayed into the tire by applying pressure to the compressible flask. After the valve core or insert has been replaced, the tire can then be re-inflated as desired (using any suitable means and method). This method and arrangement suffers in that, to be carried out, it is necessary to physically remove the valve core or insert from the tire valve itself.

In accordance with the known art there have also been used in the past sealant compositions, intended to be injected into a damaged tire, useful for emergency (and almost invariably) temporary, repair of a puncture wound in the tread portion of such tire. Such compositions have traditionally included latex (or the equivalent) as a principal constituent thereof. The compositions are intended to be injected into the tire via the tire valve (with or without valve core in place).

However the use of latex (or an equivalent) in itself has given rise to problems, due to the "sticky" nature thereof. Firstly, the use of latex will leave a sticky, messy residue in the tire valve itself, which will more often than not need to be removed/cleaned away before that valve is re-useable. Secondly, the dispensation of a latex-based composition from a container therefor will mean that such container may not be suitable for re-use, again by reason of the fact that any nozzle or the like dispensing means associated therewith, and/or any tubing or hosing for passage of the sealing composition from container to tire, will be gummed-up, perhaps even being blocked or sealed, by residual or undispersed composition.

Further, and when a latex-based composition is employed the situation is that, when air is still escaping from the tire, via the puncture, and the latex composition is oozing (under pressure) through the hole in the tire, the air causes the latex to cross-link and bond with the rubber of the tire. The end result is that, whilst the puncture may be sealed, the actual puncture site becomes extremely difficult, if not actually impossible, to locate. This inability to identify a repaired puncture site gives rise to its own problems. In accordance with regulations, and indeed using common sense, if one knows of the existence of a puncture in a tire, and even if that puncture has been temporarily repaired—using such a latex-based composition—it is still necessary to have the tire properly, and permanently, repaired. If the site cannot be located, a permanent repair cannot be effected. The alternative, then, is to physically replace the tire when punctured—an expensive exercise indeed.

There are environmental issues concerning latex and the use of latex-based compositions for purposes of temporary tire repair which may be summarized as follows:

(1) the life or age limit of latex is usually 5 years;

(2) unless the puncturing object remains in the tire it is virtually impossible to locate, inspect and repair the tire permanently—to meet with safety regulations and standards the tire must then be discarded;

(3) latex must not be allowed to enter sewerage/surface water or ground water;

(4) any used packaging contaminated with cured latex cannot be cleaned for recycling and therefore must be disposed of along with the substance;

(5) with latex, cleaning and washing the tire is problematic; the tire can only be cleaned by absorbing the liquid with cloth/rags and placing them in containers for waste disposal;

(6) latex emulsion gives off a strong ammonia vapour and is therefore not popular in tire repair shops and the like, due to this noxious odour;

(7) latex emulsion has a pH value of 10 and, if contact occurs, can cause irritation to eyes, skin or mucous membranes;

(8) latex spills will permanently stain clothing or work garments unless the excess latex is immediately removed and the garments thoroughly washed before cross-linking occurs, which usually is not feasible;

(9) latex sealants ideally should be filled into bottles under a bed of nitrogen to minimise the cross-linking effects of oxygen on latex; any oxidation is detrimental to the sealing capacity of latex and also increases the possibility of granulated particles lodging in tire valve; even occasional small droplets of latex carried by compressed air (or the like) in hoses can start "skinning" in the hose and can also end up agglomerating in the valve area; and

(10) latex contains volatile organic compositions which can be harmful to health if swallowed, cause acid burns, can cause sensitisation through skin contact and are highly toxic for aquatic organisms.

Apart from the problems associated with the prior art as outlined earlier, these days it is a trend in vehicle design that vehicles are being manufactured and marketed without being supplied with a spare wheel. This means that a practical, workable repair kit needs to be provided, such a kit being intended to be simple to operate, preferably re-usable and not requiring clean-up of excess sticky sealing compounds (as for example latex or the like).

The present invention seeks to overcome the problems and difficulties associated with the prior art practices by providing a composition and apparatus which allows for ready in situ repair—as by re-sealing—of a punctured tire, thereby eliminating the need for replacement thereof (at least temporarily).

With the composition and apparatus of this present invention it is not necessary to remove the valve core or insert from the tire valve. More importantly the composition of the present invention, by not including latex (or the equivalent), avoids the need for clean-up and disposal of residual unwanted material (latex) upon completion of any repair.

It will be understood, by those persons familiar with this art, that punctures which are capable of being effectively sealed with these types of compositions are those which occur in the substantial majority of cases to vehicle wheels in the course of normal usage, as for example, punctures to car and truck tires by nails, screws, pieces of wire and the like.

It has been found that the addition of polyacrylates and other similar synthetic elastomers, and more particularly sodium polyacrylate, to known sealant compositions, and even to components for known sealant compositions, will give rise to an overall composition which will exhibit significantly enhanced sealing properties (when compared for example with those of the present applicant's aforementioned International Application).

SUMMARY OF THE INVENTION

According to the present invention, therefore, there is provided an improved composition for the in situ sealing of a punctured tire, which composition is introducible into the tire via the tire valve thereof without there being any need to first remove the valve core or insert and without resulting in any blockage of the tire valve itself and any associated tubing, with the entire composition being capable of passing through the restricted passage existing within the valve.

In accordance with one aspect of the present invention there is provided a sealant composition for the sealing of a punctured tire including a liquid carrier, one or more viscosity and suspending agents, one or more fillers and sealants, and one or more polyacrylates.

In accordance with a preferred aspect the sealant composition in accordance with the present invention includes, as principal components, propylene glycol, ethylene glycol, water and one or more polyacrylates, more particularly, sodium polyacrylate, gum rosin, preferably with the addition of ammonia.

The said liquid carrier is selected from the group consisting of water, mixtures of water and propylene glycol, mixtures of water and ethylene glycol, mixtures of water, propylene glycol and ethylene glycol, and mixtures of propylene glycol and ethylene glycol.

The said one or more viscosity and suspending agents are selected from the group consisting of polysaccharide gum, carboxymethylcellulose, methylhydroxyethylcellulose, fumed silica and psyllium husk powder.

The one or more fillers and sealants are selected from the group consisting of pulverized bark powder, pulverized peanut shells, pulverized fibrous material, pulverized cellulosic material, fine ground rubber crumb, fine ground low density polyethylene, ground plastics, selected from nylon, polypropylene, styrene and polyethyltetrahydrophtalate, powdered Equisetum arvense, tea powder, parsley powder, diatomite, bentonite, gum resin, sodium silicate and titanium dioxide.

One or more corrosion inhibitors may be added to the sealant composition. Said one or more corrosion inhibitors are selected from the group consisting of ammonium carbonate, sodium bicarbonate and sodium borate.

According to another aspect of the present invention there is provided a composition for sealing punctures in pneumatic tires, containing a. one of more of propylene glycol, propylene-ethylene glycol blend, and water (each in the range 10-90% by weight of the composition);

b. one or more viscosity and suspending agents selected from xanthan gum (0.01 to 1.5% b.w.), methylhydroxyethylcellulose (0.01 to 1.5% b.w.), carboxymethylcellulose (0.01 to 1.5% b.w.), fumed silica (0.05 to 3.0% b.w.), psyllium husk powder (0.01 to 1.5% b.w.);

c. one or more fillers and sealing particulates selected from fine ground rubber crumb sieved to <60 microns (0.01 to 1.5% b.w.), fine ground low density polyethylene sieved to 150 microns (0.01 to 2.5% b.w.), ground plastics selected from nylon, polypropylene, styrene and polyethyltetrahydrophthalate (0.01 to 2.5% b.w.), diatomite of <60 microns diameter (0.5+5.0% b.w.), bentonite (0.01 to 1.5% b.w.), gum resin of <60 microns diameter (0.01 to 1.5% b.w.), dissolved resin (0.05 to 1.5% b.w.), and sodium silicate (0.1 to 2.0% b.w.);

d. one or more corrosion inhibitors selected from ammonium bicarbonate (0.05 to 1.5% b.w.), sodium bicarbonate (0.05 to 1.5% b.w.), and sodium borate (0.1 to 2.5% b.w.);

e. one or more synthetic elastomers, being polyacrylate type (comprising between 0.05 and 2.0% b.w. of components (a) to (d));

f. a preservative (making up rest of the composition).

The one or more synthetic elastomers may be a sodium polyacrylate.

According to yet another aspect of the present invention there is provided a composition for sealing punctures in pneumatic tires, said composition containing:

(a) one or more of the group consisting of propylene glycol, comprising from 10 to 90 percent by weight of the composition, propylene-ethylene glycol blend, comprising from 10 to 90 percent by weight of the composition, and water, comprising from 10 to 90 percent by weight of the composition;

(b) one or more viscosity and suspending agents selected from the group consisting of from 0.05 to 1.5 percent by weight of Xanthan gum, from 0.01 to 1.5 percent by weight of methylhydroxyethylcellulose, from 0.01 to 1.5 percent by weight of carboxymethylcellulose, from 0.05 to 3.0 percent by weight of fumed silica, and from 0.01 to 1.5 percent by weight of psyllium husk powder;

(c) one or more fillers and sealing particulates selected from the group consisting of from 0.01 to 1.5 percent by weight of fine ground rubber crumb sieved to <60 microns, from 0.01 to 2.5 percent by weight of fine ground low density polyethylene sieved to <150 microns, from 0.01 to 2.5 percent by weight of ground plastics from the group composed of nylon, polypropylene, styrene and polyethyltetrahydrophtalate, from 0.5 to 5.0 percent by weight of diatomite of <60 microns diameter, from 0.01 to 1.5 percent by weight of bentonite, from 0.01 to 1.5 percent by weight of gum resin of <60 microns diameter, from 0.05 to 1.5 percent by weight of dissolved resin, from 0.1 to 2.0 percent by weight of sodium silicate;

(d) one or more corrosion inhibitors selected from the group consisting of from 0.5 to 1.5 percent by weight of ammonium bicarbonate, from 0.05 to 1.5 percent by weight of sodium bicarbonate, and from 0.1 to 2.5 percent by weight of sodium borate; and (e) one or more polyacrylates, in an amount of from 0.05 to 2.0 percent by weight; and (f) a preservative making up the remainder of the composition.

According to yet another aspect of the present invention there is provided a composition for sealing punctures in pneumatic tires, said composition containing: (a) one or more of the group consisting of propylene glycol, comprising from 10 to 90 percent by weight of the composition, propylene-ethylene glycol blend, comprising from 10 to 90 percent by weight of the composition, and water, comprising from 10 to 90 percent by weight of the composition; (b) one or more viscosity and suspending agents selected from the group consisting of from 0.01 to 0.5 percent by weight of Xanthan gum, from 0.01 to 0.5 percent by weight of methylhydroxyethylcellulose, from 0.01 to 0.5 percent by weight of carboxymethylcellulose, from 0.05 to 1.0 percent by weight of fumed silica, and from 0.01 to 0.5 percent by weight of psyllium husk powder; (c) one or more fillers and sealing particulates selected from the group consisting of from 0.01 to 1.0 percent by weight of fine ground rubber crumb sieved to <60 microns, from 0.01 to 1.0 percent by weight of fine ground low density polyethylene sieved to <180 microns, from 0.01 to 1.0 percent by weight of ground plastics from the group composed of nylon, polypropylene, styrene and polyethyltetrahydrophtalate, from 0.1 to 2.0 percent by weight of diatomite of <60 microns diameter, from 0.01 to 1.0 percent by weight of bentonite, from 0.01 to 1.0 percent by weight of gum resin of <60 microns diameter, from 0.05 to 1.5 percent by weight of dissolved resin, from 0.1 to 3.0 percent by weight of sodium silicate; (d) one or more corrosion inhibitors selected from the group consisting of from 0.05 to 1.0 percent by weight of ammonium bicarbonate, from 0.05 to 1.0 percent by weight of sodium bicarbonate, and from 0.05 to 1.0 percent by weight of sodium borate; (e) one or more polyacrylates, in an amount of from 0.05 to 2.0 percent by weight; and (f) a preservative making up the remainder of the composition.

According to another aspect of the present invention there is provided a composition for use in the sealing of a damaged inflatable article, said composition including: a liquid carrier, made up of water and/or propylene glycol and/or ethylene glycol and/or propylene-ethylene glycol blend, in an amount of up to 90 percent by weight; one or more viscosity and suspension agents selected from the group comprising Xanthan gum, methylhydroxyethylcellulose, carboxymethylcellulose, fumed silica and/or psyllium husk powder; one or more fillers and sealing particulates selected from the group comprising ground rubber crumb, polyethylene, bark powder, peanut shells or the like fibrous material, ground plastics, diatomite, bentonite, gum resin and/or sodium silicate, one or more polyacrylates; and one or more corrosion inhibitors selected from the group comprising ammonia, ammonium bicarbonate, sodium bicarbonate and/or sodium borate.

According to yet another aspect of the present invention there is provided a composition for use in the sealing of a damaged inflatable article, said composition including water, from 20 to 80 percent by weight;

propylene glycol, from 20 to 80 percent by weight;

a polysaccharide gum, from 0.1 to 0.3 percent by weight;

a cellulose polymer, as for example carboxymethylcellulose, from 0.01 to 0.3 percent by weight;

fumed colloidal silica, from 0.1 to 0.5 percent by weight;

ammonium bicarbonate, from 0.1 to 1 percent by weight;

borax, from 0.1 to 2 percent by weight;

Diatomite (less than 30 micron), from 1.0 to 5.0 percent by weight;

LDPE (less than 100 micron) from 0.01 to 0.5 percent by weight;

Bentonite (less than 40 micron) from 0.1 to 1.0 percent by weight;

gum resin (less than 30 micron) from 0.05 to 0.5 percent by weight;

one or more polyacrylates, in an amount of from 0.05 to 2.0 percent;

and a preservative from 0.1 to 0.5 percent by weight.

According to yet another aspect of the present invention there is provided a composition for use in the sealing of a damaged inflatable article, said composition including water, from 10 to 90 percent by weight; propylene glycol, from 10 to 90 percent by weight; a polysaccharide gum, from 0.01 to 0.3 percent by weight; a cellulose polymer, as for example carboxymethylcellulose, from 0.01 to 0.3 percent by weight; fumed colloidal silica, from 0.05 to 0.5 percent by weight; ammonium bicarbonate, from 0.05 to 1 percent by weight; borax, from 0.05 to 1.0 percent by weight; diatomite (less than 60 micron), from 0.05 to 1.0 percent by weight; high density polyethylene/low density polyethylene powder (less than 180 micron) from 0.01 to 0.5 percent by weight; bentonite (less than 40 micron) from 0.01 to 0.5 percent by weight; gum resin (less than 60 micron) from 0.01 to 0.5 percent by weight; one or more polyacrylates, in an amount of from 0.05 to 1.0 percent; and a preservative from 0.1 to 0.5 percent by weight.

According to yet another aspect of the present invention there is provided a composition for use in sealing a punctured vehicle tire, said composition containing the following constituents (with all amounts in percentage by weight):

a hot melt pre-mix consisting making up 10.5 percent of the final composition, and consisting of the following constituents (with all amounts in percentage by weight of the pre-mix)

| | |
|---|---|
| a hydrophobic tackifying resin | 12.5 |
| rice bran | 4.0 |
| magnesium carbonate | 2.0 |
| ethylene glycol | 81.5; | a gum resin pre-mix, making up 12.5 percent of the final composition, and consisting of the following components (with all amounts and percentage by weight of the pre-mix)

| | |
|---|---|
| gum resin | 12.5 |
| rice bran | 4.0 |
| magnesium carbonate | 2.0 |
| ethylene glycol | 81.5; | a casein pre-mix, making up 4.25 percent of the final composition and consisting of the following components (with all amounts in percentage by weight of the pre-mix)

| | |
|---|---|
| casein | 15.0 |
| rice bran | 1.0 |
| magnesium carbonate | 0.5 |
| ethylene glycol | 83.5 |
| glycerine | 3.0 |
| skim milk powder | 0.75; | a resin soluble solution pre-mix, making up 9 percent of the final composition, and consisting of the following components (with all amounts in percentage by weight of the pre-mix)

| | |
|---|---|
| ethylene glycol | 18.0 |
| propylene glycol | 50.0 |
| water | 15.8 |
| ammonia (20 percent) | 3.5 |
| ethylalcohol | 3.5 |
| formalin | 0.2 |
| gum resin | 9.0 |
| magnesium carbonate | 0.5; | a dilution solution pre-mix, making up 57.25 percent of the final composition, and consisting of the following components (with all amounts in percentage by weight of the pre-mix)

| | |
|---|---|
| propylene glycol | 2.1 |
| glycerine | 1.0 |
| ethylene glycol | 36.0 |
| water | 60.0 |
| ammonia | 0.3 |
| formalin | 0.3 |
| opacifier (PVA) | 0.15 |
| fluorescein | 0.02 |
| glycerine | 3.0 |
| skim milk powder | 0.75 |
| magnesium carbonate | 0.05 |
| water | 2.5, and | one or more polyacrylates, in an amount of from 0.05 to 2.0 percent.

According to yet another aspect of the invention there is provided a composition for use in sealing a punctured vehicle tire, said composition containing the following constituents (with all amounts in percentage by weight):

a hot melt pre-mix consisting making up 10.5 percent of the final composition, and consisting of the following constituents (with all amounts in percentage by weight of the pre-mix)

| | |
|---|---|
| a hydrophobic tackifying resin | 12.5 |
| rice bran | 4.0 |
| magnesium carbonate | 2.0 |
| propylene glycol | 81.5; | a gum resin pre-mix, making up 12.5 percent of the final composition, and consisting of the following components (with all amounts and percentage by weight of the pre-mix)

| | |
|---|---|
| gum resin | 12.5 |
| rice bran | 4.0 |
| magnesium carbonate | 2.0 |
| propylene glycol | 81.5; | a casein pre-mix, making up 4.25 percent of the final composition and consisting of the following components (with all amounts in percentage by weight of the pre-mix)

| | |
|---|---|
| casein | 15.0 |
| rice bran | 1.0 |
| magnesium carbonate | 0.5 |
| ethylene glycol | 79.75; |
| glycerine | 3.0 |
| skim milk powder | 0.75 | a resin soluble solution pre-mix, making up 9 percent of the final composition, and consisting of the following components (with all amounts in percentage by weight of the pre-mix)

| | |
|---|---|
| ethylene glycol | 17.5 |
| propylene glycol | 50.0 |
| water | 15.8 |
| ammonia (20 percent) | 3.5 |
| ethylalcohol | 3.5 |
| formalin | 0.2 |
| gum rosin | 9.0 |
| magnesium carbonate | 0.5; | a dilution solution pre-mix, making up 63.75 percent of the final composition, consisting of the following components (with all amounts in percentage by weight of the dilution pre-mix)

| | |
|---|---|
| propylene glycol | 4.6 |
| glycerine | 1.0 |
| ethylene glycol | 29.53 |
| water | 60.0 |
| ammonia | 0.3 |
| sodium polyacrylate | 0.3 |
| formalin | 0.3 |
| opacifier (PVA) | 0.15 |
| fluorescein | 0.02 |
| glycerine | 3.0 |
| skim milk powder | 0.75 |
| magnesium carbonate | 0.05. |

The one or more polyacrylates may be sodium polyacrylates.

According to another aspect of the present invention there is provided a method for the preparation of a composition as disclosed above, wherein the hot melt resin pre-mix, gum resin pre-mix and casein pre-mix as disclosed above are separately blended and reduced in temperature to −20° C. and separately milled to approximately 150-200 micron particle size; a resin soluble solution pre-mix as disclosed above is prepared by adding gum resin to half of the propylene glycol and heating to 80° C. until fully melted, the remainder of the propylene glycol being mixed with the remaining ingredients of the pre-mix, followed by the slow addition of the hot phase of the resin glycol mixture with stirring; all components of the final composition are then added together, cooled to −30° C. and passed through a colloid mill to form a colloidal suspension with particle size not exceeding 130 micron.

According to another aspect of the present invention there is provided a process for preparing a composition for sealing punctures in pneumatic tires, said process including the steps of:

A. forming a hot phase premix by adding rosin (comprising between 0.5 and 5.0% by weight of the final composition) and propylene glycol (comprising between 0.5 and 5.0% by weight of the final composition) to a steam jacketed vessel and heating to a temperature of about 100° C. until the rosin is fully melted in the propylene glycol, followed by cooling with stirring until a temperature of about 50° C. is reached, then adding ethyl alcohol (comprising between 0.3 and 5.0% by weight of the final composition), 20% ammonia (comprising between 0.15 and 1.5% by weight of the final composition), water (comprising between 0.0 and 5.0% by weight of the final composition), polyethylene powder (from 10 micron to 180 micron in size) (comprising between 0.15 and 5.0% by weight of the final composition), diatomite (comprising between 0.15 and 3.0% by weight of the final composition) while continuing stirring;

B. forming a gel phase premix in a separate vessel by adding, with stirring, sodium polyacrylate (comprising between 0.2 and 1.5% by weight of the final composition) to water (comprising between 10 and 20% by weight of the final composition) at a temperature of about 25° C., continuing stirring for up to 15 minutes, then adding with stirring propylene glycol (comprising between 0.0 and 10% by weight of the final composition), 20% ammonia (comprising between (0.01 and 0.3% by weight of the final composition) and a portion of hot phase premix formed by step A (comprising between 0.2 and 5.0% by weight of the final composition);

C. in another separate vessel adding, and mixing with stirring, water (comprising between 20 and 80% by weight of the final composition), propylene glycol (comprising between 10 and 50% by weight of the final composition), ethylene glycol (comprising between 0 and 30% by weight of the final composition), 20% ammonia (comprising between 0.2 and 1.5% by weight of the final composition), the remainder of the hot phase premix (the total hot phase premix ultimately comprising between 3.0 and 20.0% by weight of the final composition), the gel phase premix (after passing through a grinder to reduce the particle size to between 50 micron and 2000 micron) (comprising between 5.0 and 20% by weight of the final composition); then continually stirring the resultant composition for up to 24 hours with ambient temperature being reached.

According to another aspect of the present invention there are provided compositions for sealing punctures in pneumatic tires prepared by one of the above-described processes.

According to another aspect of the present invention there is also provided a composition for use in sealing a punctured vehicle tire, said composition containing the following constituents (with all amounts in percentage by weight): a dilution solution pre-mix consisting of the following components (with all amounts in percentage by weight of the pre-mix)

| Propylene Glycol | 2.1 |
| Glycerine | 1.0 |
| Ethylene Glycol | 36.0 |
| Water | 60.0 |
| Ammonia | 0.3 |
| Formalin | 0.3 |
| Opacifier (PVA) | 0.15 |
| Fluorescein | 0.02 | to which has been added a polyacrylate at an amount of between 0.05 percent and 2.0 percent by weight of the premix, followed by high shear mixing to mill the polyacrylate particles down to less than 150 microns.

DESCRIPTION OF THE INVENTION

Compositions in accordance with the invention achieve their effectiveness—as compared with the latex-based prior art compositions—by virtue of them being based on/in the form of a colloidal dispersion blended with other fine particles which is capable of passing through the restrictive passage afforded by a valve core of a tire valve without resulting in blockage thereof, yet at the same time retains sufficient sealing properties to be capable of repairing punctures. It is important also that there be only minimal separation of ingredients within the tire chamber when the liquid is subjected to centrifugal force at 80 kph.

Due to the restricted passage available through a valve core the liquid must be formulated in such a way that the sealing particles retained therein pass freely through the valve unhindered and therefore do not agglomerate anywhere, so as to avoid the possibility of blockage occurring.

The liquid carrier may be water, in an amount of from 10 to 90 percent by weight. Alternatively, a mixture of water and propylene glycol and/or ethylene glycol, again in an amount of from 10 to 90 percent by weight, may be employed. In yet a further alternative the liquid carrier may be a mixture of propylene glycol and ethylene glycol, again in an amount of from 10 to 90 percent by weight. The principal requirement of the liquid carrier is that it is substantially inert in terms of its reacting with the other constituents of the overall composition. In an especially preferred embodiment the liquid carrier will be a mixture of up to 30 percent by weight water and up to 30 percent by weight of propylene glycol and/or ethylene glycol.

Insofar as the viscosity and suspension agents are concerned, any one (or more) of the following may be employed:

(a) a polysaccharide gum, as for example Xanthan gum, in an amount of from 0.05 to 1.0 percent by weight, more preferably about 0.25 percent by weight;

(b) carboxymethylcellulose and/or methylhydroxyethyl-cellulose, in an amount of from 0.01 to 1.0, more preferably about 0.05, percent by weight; and/or (c) fumed silica (more especially that available under the name/trade mark AEROSIL R972), in an amount of from 0.01 to 1.0, more preferably about 0.05, percent by weight.

A preferred suspension medium is a combination of 0.15 to 0.2 percent Xanthan gum and 0.05 to 0.075 percent methyl hydroxyethylcellulose. To allow for prolonged storage in motor vehicles (for as long as 8 years) all solid particles in the formulation must remain substantially in suspension during a test when subjected to 80° C. temperature for a period of 12 hours and can easily be redispersed after shaking.

The fillers or particulates in the composition, whose function is to seal the puncture, may include any one or more of the following:

(a) pulverized bark powder and/or pulverized peanut shells, or the like fibrous or cellulosic material, of a particle size less than 150 micron and in an amount of from 0.01 to 1.0, more preferably about 0.075, percent by weight;

(b) powdered Equisetum Arvense (commonly known as "horsetail"), of a particle size less than 150 micron and in an amount of from 0.01 to 1.0, more preferably about 0.06, percent by weight;

(c) tea powder, of a particle size less than 150 micron and in an amount of from 0.01 to 1.0, more preferably about 0.05, percent by weight;

(d) parsley powder, of a particle size less than 150 micron and in an amount of from 0.01 to 1.0, more preferably about 0.05, percent by weight;

(e) diatomite, of a particle size less than 30 micron and in an amount of from 0.05 to 5.0, more preferably about 1.5, percent by weight;

(f) (0 Bentonite, of a particle size less than 40 micron and in an amount of from 0.15 to 5.0, more preferably about 0.75, percent by weight;

(g) gum rosin, of a particle size less than 30 micron and in an amount of from 0.05 to 1.5, more preferably about 0.2, percent by weight; and/or (h) titanium dioxide, in an amount of from 0.01 to 1.0, more preferably about 0.10, percent by weight.

Any suitable corrosion inhibitors may be employed. Preferably such may be a combination of one or more of the following:

(a) ammonium carbonate, in an amount of from 0.01 to 1.0, more preferably about 0.06, percent by weight;

(b) sodium bicarbonate, in an amount of from 0.1 to 1.0, more preferably about 0.06, percent by weight; and/or (c) sodium borate, in an amount of from 0.02 to 2.0 more preferably about 0.12, percent by weight.

Experience/experimentation has revealed that, internally of a tire, corrosive elements/components can exist and/or be formed. By way of example only, traces (minor amounts) of sulphuric acid can be found to leak from a tire. Furthermore, corrosive elements/components can be created/formed within the tire chamber itself, as for example traces of ozone generated by static electricity (between for example the tire bead and the associated wheel/rim).

Such corrosive elements can, with time, have a deleterious effect on any exposed metal of the wheel/rim. For that reason, in an especially preferred embodiment the composition in accordance with the present invention will have included therein one or more corrosive inhibitors. Such will preferably be from the group including ammonium bicarbonate, sodium bicarbonate and/or sodium borate. Ammonium bicarbonate and/or sodium bicarbonate may be included in an amount of from 0.01 to 1.0 percent, most preferably 0.06 percent, by weight. Sodium borate may be included in an amount of from 0.02 to 2.0 percent, most preferably 0.12 percent by weight.

It has been found that the addition of synthetic elastomers such as polyacrylates substantially reduces settling and improved suspension of fine particles and further improves the sealing performance of the sealing compositions. The preferred rate of addition of polyacrylate, or similar synthetic elastomers, is between 0.05 percent and 2.0 percent by weight of the overall composition. The percentage of the addition depends upon the type of polymer. Higher percentages of polyacrylate will have been found to increase the viscosity and seriously limit the easy flow of the sealant within the tire chamber.

It has also been found that polyacrylate will work as a sealant in its own right when added to ethylene glycol/propylene glycol/water solutions. A preferred sealing composition according to this aspect contains propylene glycol, glycerine, ethylene glycol, water, ammonia, formalin, an opacifier, and fluorescein to which is added polyacrylate, or any other synthetic elastomer, at a ratio of between 0.05 percent to 2.0 percent by weight, followed by milling down to less than 150 micron. This composition works effectively as a sealant and is capable of passing through the valve core. The polyacrylate is added to the other components and passed through a high shear mixer. The result is a fine dispersion of the synthetic polymer throughout the composition which doubles as a suspending agent and as a sealing agent. While this particular range of compositions show satisfactory sealing properties, the longevity of the compositions is uncertain.

As can be seen from above the sealing composition in accordance with the present invention is in the form of a stable aqueous suspension of one or more solid particulate materials, wherein the particulate material preferably is a minor amount of the overall composition. The carrier fluid, such as water, or water in combination with propylene glycol and/or ethylene glycol and the minor amounts of one or more solid particulate materials (which are substantially insoluble in the liquid components of the composition) are inert to the rubber composition of the tire into which it is intended to be placed.

The particulate material making up the "solid" component of the composition may include materials such as vermiculite, diatomaceous earth and other infusorial earths, various forms of mica and other finely divided solids.

A sealant or sealant composition in accordance with the present invention, being an improvement on latex-based compositions presently in use, constitutes a means for repair (at least temporarily) of a puncture in a pneumatic tire, the composition being readily capable of being introduced into the damaged tire by means of compressed air or gas propellant.

The arrangement is such as to allow a particle-based sealant composition—as distinct from the prior art latex-based compositions—to be injected into the damaged tire via the tire valve, with the valve core or insert in place.

Ecological benefits of non-latex sealant compositions include:

(1) the expiry date of packaged product is increased substantially;

(2) after the tire is cleaned it is possible to locate the puncture site for inspection and repair and prevent the tire from being discarded;

(3) particle-based sealant can be allowed to enter the sewer system;

(4) packaging can be easily cleaned for re use and/or recycling;

(5) cleaning rags can be washed and re-used repeatedly with no requirement for them to enter the waste stream;

(6) a non-latex sealant does not have a noxious odour;

(7) the pH of the product is almost neutral and, apart from the ethylene glycol content, is not considered an irritant;

(8) any spills or splashes on clothing or equipment will wipe or wash off readily; and (9) due to the controlled size of particles in the carrier fluid the valve is left with only minimal contamination after treating the tire.

In accordance with car industry desiderata, for a sealant composition to be approved for use in vehicles (or with vehicles) it must satisfy certain requirements and meet certain parameters. By way of example a sealant composition is required to be effective within a temperature range of from −40° C. to +80° C. With such a requirement, problems in terms of performance have been identified with the compositions as defined and exemplified, for example, in the present applicant's International Patent Application No. PCT/AU2007/001222. By way of example only substances such as xanthan gum, rice bran etc. as referred to in the said International Application have been found to restrict the flow of liquid in the tire chamber, and are not therefore as effective in terms of their ability to seal punctures. Whilst such substances have been found to function satisfactorily at temperatures down to −30° C., at lower temperatures their viscosity has been found to increase to an extent wherein they may not flow as smoothly through the reduced space of a valve core of a tire valve or the like, giving rise to an increase likelihood of blockage of such a valve.

To achieve an optimum result and satisfy the aforementioned desiderata, and also preferably to ensure a simplified formula for the overall composition, it is desirable to utilise a composition which still flows freely at temperatures as low as −40° C. In that regard, in order to achieve sealing in the high deflection area of a tire's "footprint", a degree of flexibility needs to be inherent in the particles intended to make up a seal in or at the site of a puncture. This, in accordance with the present invention, may be achieved by the inclusion of elastic/elastomeric material, such as fine ground rubber, low density polyethylene, sodium polyacrylate and the like.

Fillers and particles from the components such as elastomers, which exhibit a degree of flexibility, can be substituted for the substantially non-flexible sealing particles as referred to in the said International Patent Application No. PCT/AU2007/001222.

Sodium polyacrylate granules when dispersed in water quickly soften and swell. Depending upon particle size finely ground polyacrylates can also exhibit pseudo mucilaginous gel like properties. This phenomenon enables softened sodium polyacrylate particles, preferably in the range between 10 micron and 300 micron, to reliably squeeze through the restricted passage of a tire valve core. The physical properties of sodium polyacrylate facilitate the transport of the largest possible particle size (up to 200 micron) of solid particles by escorting the particles through the highly restricted passageway of a tire valve core.

The elastomeric jelly like structure of swollen saturated sodium polyacrylate also allows solid particles such as polyethylene powder (not exceeding 180 micron), pulverized bark, tea, Equisetum, etc., to physically embed into the softened sodium polyacrylate. The very large particles of sodium polyacrylate (up to 300 micron) have a dual function—as well as guiding the solid particles, they act as a sweeper that helps to continually clear away any particles that may become trapped in the tire valve core mechanism. The partial encapsulation-like process affords a controlled and even distribution of the solid particles in the composition and is an effective technique to limit the risk of blockage in the tire valve core. When the sealant composition is pressurized and driven by 6-8 bar air/gas pressure through a tire valve core the resulting high velocity of the sealant composition passing through the tire valve core (equating to about 20 ml per second) overcomes the tendency for solid particles to agglomerate and block the core. If the flow rate through the tire valve core drops to about 2-3 ml per second the valve core will instantly or very rapidly block. Without the combination of high velocity and partial impregnation of solid particles in the sodium polyacrylate or partial surrounding of the solid particles by the sodium polyacrylate, blockage of the tire valve core would occur instantly or very rapidly.

The physical process of sealing a puncture in a tire with a particle-based valve-through sealant composition is dependent upon the flow rate. As a result of the comparatively low velocity of air escaping through the confines of a puncture site in a tire at around 2 bar air pressure (this equates to between about 0.1 ml and 3 ml per second), the reduced speed of the solid particles agglomerate and effectively block and seal the puncture instantly or very rapidly, whereas during installation of the sealant composition through a tire valve core the high velocity of the particles counteracts the blocking effect.

Sealing punctures in the crown area of a tire is relatively simple as a constant supply is maintained at the puncture site while the vehicle is being driven. When the puncture is located outside this region and in the extreme shoulder area the opportunity for the sealant composition to flood the puncture site while the vehicle speed is above 3 kmh is minimal. If the puncturing object is wider that 5 mm and up to 6.25 mm in diameter and if the puncture site is in the shoulder area there is a likelihood that the tire will lose air pressure. The challenge, as with all tire sealants, is to ensure durability of the seal in the shoulder area over extended periods of non-stop driving. Normally the recommended maximum driving speed is limited to 90 kmh. This is enable the driver to safely control the vehicle in the event of a sudden loss of pressure in a temporarily repaired tire. If a vehicle is driven continually while air pressure in a tire is being lost due to a puncture in the shoulder area caused by a 6.25 mm diameter puncturing object, air loss will cease once the tire has lost about half its recommended tire air pressure. As a tire loses air pressure the footprint area of the tire increases and sidewall distance to the footprint area decreases. This causes a change in the dynamics of the flow pattern of the liquid sealant composition inside the tire. As the footprint area increases so does width of sealant composition coverage in that area. Due to radial variation the liquid sealant composition fish tails in the flat footprint area thereby forcing the sealant composition to reach an extreme sidewall intrusion once every revolution of the tire.

DESCRIPTION OF PREFERRED EMBODIMENTS

In order that the invention may be more clearly understood and put into practical effect there shall now be described in detail preferred embodiments of sealing compositions in accordance with the invention.

Example 1

A sealant composition in accordance with the present invention includes a suitable elastomer, more especially sodium polyacrylate, in suspension. The sodium polyacrylate, in particulate form, when in such a suspension will pass through the tire valve without blockage.

The composition is prepared in two parts, hereinafter referred to as a pre-mix gum rosin solution (A) and particulate solution (B) respectively, and then combined as explained hereinafter.

The pre-mix gum rosin solution (A) includes the following (with the amounts being given in percentages by weight):

| (1) | ethylene glycol | 18; |
| (2) | propylene glycol | 24; |
| (3) | water | 15.8; |
| (4) | ammonia 20% | 4.0; |
| (5) | alcohol | 4.0; |
| (6) | formalin | 0.2; |
| (7) | propylene glycol | 24.0 and |
| (8) | gum rosin | 10.0. |

This solution (A) is formed as explained hereinafter.

Ingredients (1) to (6) are first combined, in descending order preferably, with stirring. Separately the gum rosin (7) is added into the remaining propylene glycol and that mix is heated, to around 80° C., until the gum rosin is fully melted. That hot mix of gum rosin and propylene glycol is then added to the mixture of ingredients (1) to (6), while stirring.

As to the particulate solution, preferably such is made up from the following:

| (9) | sodium polyacrylate | 0.75; |
| (10) | water | 41.0; |
| (11) | propylene glycol | 5.9; |
| (12) | ethylene glycol | 42.0; |
| (13) | ammonia (20%) | 0.2; |
| (14) | formalin | 0.15; | with the balance, of the order of 10% by weight, being made up of gum rosin solution (A).

The gum rosin solution, where added to particulate solution (B), has been found to prevent the sodium polyacrylate from gelling. The particulate solution (B) is subjected to high shear mixing or grinding and it is important that gelling does not occur during such a process.

In practice solution (B) is subjected to high shear mixing with a homogenizer and/or passed through a liquid grinder to a first shape particle size reduction of the sodium polyacrylate. Such treatment is contained until the suspension becomes smooth. The suspension is then preferably cooled to a temperature of the order of −20° C. and the product then passed through a colloid mill (or similar grinder) to ensure that particulate size does not exceed 130 micron.

Experimentation has shown that a polyacrylate in an amount of the order of from 0.05 to 3.0, more preferably about 0.75, percent by weight is needed to give use to an acceptable sealing effect. Such experiments have also shown that, without the presence of gum rosin, the composition would not be workable, especially at temperatures of around −40° C. At such temperatures the overall composition, without gum rosin, would be too viscous and may even exhibit a degree of brittleness. In fact, at temperatures of that order a reduction in the degree of elasticity would mean that particles within the composition and intended to seal a puncture would not seal properly, exhibiting a tendency to separate from the puncture, as for example due to vibrations, etc. caused by tire movement.

The use of gum rosin has been found to allow for regulation and control of the viscosity of the overall solution, and in particular the polyacrylate particulate material used for purposes of sealing a puncture. It is possible, as a result of employing the rosin solution, to maintain overall viscosity of the composition at an acceptable level, allowing it to readily travel from the container, through the valve into the tire and then to the puncture site.

Whilst, as set out in the Example, sodium polyacrylate is utilised, it should be understood that in accordance with the invention any substance belonging to the "family" of elastomeric resins may be employed. This includes those made available by National Starch, in their Elotek range, such as FX 4130 and FL 1212.

In the instance of a puncture occurring in the tire's shoulder area the formulation must exhibit exceptional sealing capability. This is essential as virtually no liquid is available to flow to a shoulder area puncture site once the vehicle operates above from 3 to 4 kilometers per hour. The liquid will be confined to the internal crown area inside the tire chamber due to centrifugal force. It is therefore important that the correct combination of selected ingredients be combined in the right ratio to allow the composition to function satisfactorily regardless of the site of any puncture. Preferably the composition should be capable of sealing a puncture caused by, for example, a spike of up to about 6.25 mm diameter.

Example 2

Another preferred embodiment relates to a process for preparing a composition for sealing punctures and pneumatic tires, said process including the steps of:

A. forming a hot phase premix by adding rosin (comprising 1.5% by weight of the final composition) and propylene glycol (comprising 1.5% by weight of the final composition) to a steam jacketed vessel and heating to a temperature of about 100° C. until the rosin is fully melted in the propylene glycol, followed by cooling with stirring until a temperature of about 50° C. is reached, then adding ethyl alcohol (comprising 1.0% by weight of the final composition), 20% ammonia (comprising 0.4% by weight of the final composition), water (comprising 0.7% by weight of the final composition), polyethylene powder (from 10 micron to 180 micron in size) (comprising 1.0% by weight of the final composition), diatomite (comprising 0.8% by weight of the final composition), and zinc stearate (comprising 0.2% by weight of the final composition) while continuing stirring;

B. forming a gel phase premix in a separate vessel by adding, with stirring, sodium polyacrylate (comprising 0.2% by weight of the final composition) to water (comprising 11.43% by weight of the final composition) at a temperature of about 25° C., continuing stirring for up to 15 minutes, then adding with stirring propylene glycol (comprising 3.5% by weight of the final composition), 20% ammonia (comprising 0.07% by weight of the final composition) and a portion of hot phase premix formed by step A (comprising 0.8% by weight of the final composition);

C. in another separate vessel adding, and mixing with stirring, water (comprising 33.2% by weight of the final composition), propylene glycol (comprising 33% by weight of the final composition), ethylene glycol (comprising 10% by weight of the final composition), 20% ammonia (comprising 0.35% by weight of the final composition), the remainder of the hot phase premix (the total hot phase premix ultimately comprising 7.1% by weight of the final composition), the gel phase premix (after passing through a grinder to reduce the particle size to between 50 micron and 2000 micron) (comprising 16% by weight of the final composition); then continually stirring the resultant composition for up to 24 hours with ambient temperature being reached.

Formalin (comprising 0.15% by weight of the final composition) may be added during step C. Additionally, opacifier and/or PVA/MA may also be added during step C. While it is preferred to add opacifier and/or PVA/MA, such is not an essential component; the primary role of this component is to render the composition non-clear, although it also assists the sealing function of the composition.

The ethyl alcohol in the hot phase premix assists in storage of that premix, while the polyethylene powder acts as a binder. The diatomite functions as a sealer. The 20% ammonia serves to keep rosin in solution both in the hot phase premix and in the gel phase premix.

Example 3

A composition for use in sealing a punctured vehicle tire, said composition containing the following constituents (with all amounts in percentage of the final composition by weight):

| | | |
|---|---|---|
| (1) | propylene glycol | 81.0 |
| (2) | glycerine | 1.0 |
| (3) | xanthan gum | 0.11 |
| (4) | Psyllium husk powder | 0.012 |
| (5) | carboxymethylcellulose | 0.03 |
| (6) | diatomaceous earth | 0.25 |
| (7) | gum resin powder | 1.35 |
| (8) | magnesium carbonate | 0.135 |
| (9) | rice husk powder | 0.3 |
| (10) | titanium dioxide | 0.075 |
| (11) | cork powder | 0.15 |
| (12) | bark powder (dry) | 0.1 |
| (13) | equisetum powder | 0.1 |
| (14) | polyethylene powder | 0.2 |
| (15) | water | 13.176 |
| (16) | sodium bicarbonate | 0.05 |
| (17) | ammonium carbonate | 0.05 |
| (18) | sodium borate | 1.0 |
| (19) | formalin | 0.2 |
| (20) | fluorescein | 0.012, and | one or more polyacrylates, in an amount of from 0.05 to 2.0 percent by weight.

Example 4

A composition for use in sealing a punctured vehicle tire, said composition containing the following constituents (with all amounts in percentage of the final composition by weight):

| | | |
|---|---|---|
| (1) | propylene glycol | up to 82.0 |
| (2) | glycerine | 0.5 |
| (3) | xanthan gum | 0.11 |
| (4) | Psyllium husk powder | 0.012 |
| (5) | carboxymethylcellulose | 0.03 |
| (6) | diatomaceous earth | 0.25 |
| (7) | gum resin powder | 1.75 |
| (8) | titanium dioxide | 0.05 |
| (9) | rice bran powder | 0.45 |
| (10) | cork powder | 0.15 |
| (11) | bark powder (dry) | 0.10 |
| (12) | equisetum powder | 0.10 |
| (13) | polyethylene powder | 0.25 |
| (14) | water | up to 13.8936 |
| (15) | sodium bicarbonate | 0.05 |
| (16) | ammonium carbonate | 0.05 |
| (17) | sodium borate | 0.10 |
| (18) | formalin | 0.20 |
| (19) | fluorescein | 0.12, and | one or more polyacrylates, in an amount of from 0.05 to 2.0 percent.

Example 5

A composition for use in sealing a punctured vehicle tire, said composition containing the following constituents (with all amounts in percentage of the final composition by weight):

| | | |
|---|---|---|
| (1) | ethylene glycol | up to 50.0 |
| (2) | propylene glycol | up to 12.56 |
| (3) | glycerine | 1.0 |
| (4) | marsh mallow root powder | 2.5 |
| (5) | Psyllium husk powder | 0.35 |
| (6) | xanthan gum | 0.02 |
| (7) | carboxymethylcellulose | 0.01 |
| (8) | Aerosil R2 | 0.05 |
| (9) | magnesium carbonate | 0.25 |
| (10) | water | 30.0 |
| (11) | ammonium bicarbonate | 30.0 |
| (12) | sodium bicarbonate | 0.15 |
| (13) | sodium borate | 0.15 |
| (14) | formalin | 0.30 |
| (15) | fluorescein | 0.15 |
| (16) | gum resin | 1.50 |
| (17) | ethyl alcohol | 1.0, and | one or more polyacrylates, in an amount of from 0.05 to 2.0 percent.

Example 6

A process for preparing a composition for sealing punctures in pneumatic tires, said process including the steps of A. forming a hot phase premix by adding rosin (comprising between 0.3 and 3.0% by weight of the final composition) and propylene glycol (comprising between 0.5 and 5.0% by weight of the final composition) to a steam jacketed vessel and heating to a temperature of about 100° C. until the rosin is fully melted in the propylene glycol, followed by cooling with stirring until a temperature of about 50° C. is reached, then adding ethyl alcohol (comprising between 0.3 and 5.0% by weight of the final composition), 20% ammonia (comprising between 0.1 and 1.0% by weight of the final composition), water (comprising between 0.0 and 5.0% by weight of the final composition), polyethylene powder (from 10 micron to 180 micron in size) (comprising between 0.05 and 2.0% by weight of the final composition), magnesium carbonate (comprising between 0.1 and 2.0% by weight of the final composition) and Aerosil R972 (comprising between 0.05 and 1% by weight of the final composition) while continuing stirring;

B. forming a gel phase premix in a separate vessel by adding, with stirring, sodium polyacrylate (comprising between 0.1 and 1.5% by weight of the final composition) to water (comprising between 5 and 20% by weight of the final composition) at a temperature of about 25° C., continuing stirring for up to 6 hours, then adding with stirring propylene glycol (comprising between 0.0 and 10% by weight of the final composition), 20% ammonia (comprising between 0.05 and 0.3% by weight of the final composition) and a portion of hot phase premix formed by step A (comprising between 0.2 and 5.0% by weight of the final composition);

in another separate vessel adding, and mixing with stirring, water (comprising between 20 and 80% by weight of the final composition), propylene glycol (comprising between 10 and 60% by weight of the final composition), ethylene glycol (comprising between 0 and 50% by weight of the final composition, 20% ammonia (comprising between 0.05 and 0.5% by weight of the final composition), the remainder of the hot phase premix (the total hot phase premix ultimately comprising between 3.0 and 20.0% by weight of the final composition), the gel phase premix (after passing through a grinder to reduce the particle size to between 30 micron and 250 micron) (comprising between 5.0 and 20% by weight of the final composition);

then continually stirring the resultant composition for up to 24 hours with ambient temperature being reached.

Example 7

A process for preparing a composition for sealing punctures in pneumatic tires, said process including the steps of:

A. forming a hot phase premix by adding rosin (comprising 1.5% by weight of the final composition) and propylene glycol (comprising 1.5% by weight of the final composition) to a steam jacketed vessel and heating to a temperature of about 100° C. until the rosin is fully melted in the propylene glycol, followed by cooling with stirring until a temperature of about 50° C. is reached, then adding ethyl alcohol (comprising 1.0% by weight of the final composition), 20% ammonia (comprising 0.4% by weight of the final composition), water (comprising 0.7% by weight of the final composition), polyethylene powder (from 10 micron to 180 micron in size) (comprising 1.0% by weight of the final composition), Magnesium Carbonate (comprising 0.5% by weight of the final composition), and zinc stearate (comprising 1.0% by weight of the final composition) while continuing stirring;

B. forming a gel phase premix in a separate vessel by adding, with stirring, sodium polyacrylate (comprising 0.3% by weight of the final composition) to water (comprising 11.43% by weight of the final composition) at a temperature of about 25° C., continuing stirring for up to 6 hours, then adding with stirring propylene glycol (comprising 3.5% by weight of the final composition), 20% ammonia (comprising 0.15% by weight of the final composition) and a portion of hot phase premix formed by step A (comprising 0.5% by weight of the final composition);

C. in another separate vessel adding, and mixing with stirring, water (comprising 33.2% by weight of the final composition), propylene glycol (comprising 33% by weight of the final composition), ethylene glycol (comprising 10% by weight of the final composition), 20% ammonia (comprising 0.2% by weight of the final composition), the remainder of the hot phase premix (the total hot phase premix ultimately comprising 7.1% by weight of the final composition), the gel phase premix (after passing through a grinder to reduce the particle size to between 30 micron and 250 micron) (comprising 16% by weight of the final composition);

then continually stirring the resultant composition for up to 24 hours with ambient temperature being reached.

Example 8

A process for preparing a composition for sealing punctures in pneumatic tires, said process including the steps of:

(1) Forming a TPS (Tapioca Solution)-premix by dispersing tapioca starch (comprising 0.16% by weight of the final composition), in propylene glycol (comprising 1.29% by weight of the final composition), and water (comprising 1.13% by weight of the final composition), while stirring and heating to 80° C. until a solution becomes clear;

(2) Forming an SPA (Sodium Poly Acrylate)-premix by adding sodium polyacrylate (comprising 0.19% by weigh of the final composition) to water (comprising 10.34% by weight of the final composition) in a vessel at 25° C. and stirring for six hours, thereafter adding propylene glycol (comprising 2.52% by weight of the final composition), 20% ammonia (comprising 0.06% by weight of the final composition), and rosin solution (comprising 0.76% by weight of the final composition) and circulating for 24 hours through a high shear pump to reduce the sodium polyacrylate particle size down to between 25 micrometers and 250 micrometers.

(3) Forming a CSN (Casein)-premix by adding casine (comprising 0.27% by weight of the final composition) in a separate vessel to alcohol (comprising 0.22% by weight of the final composition), propylene glycol (comprising 0.22% by weight of the final composition), 20% ammonia (comprising 0.03% by weight of the final composition), and water (comprising 0.04% by weight of the final composition), and circulating the resulting mixture through a high shear pump until the premix/solution becomes smooth and viscous.

(4) Forming an RSN (Rosin)-premix by adding, to a steam jacketed vessel, rosin (comprising 1.09% by weight of the final composition), and propylene glycol (comprising 1.09% by weight of the final composition), and heating the mixture to 100° C., and after the rosin is fully melted, stirring the mixture until cooled to 55° C., and then adding alcohol (0.12% by weight of the final composition), 20% ammonia (0.25% by weight of the final composition), CSN-premix (comprising 0.26% by weight of the final composition), and water (comprising 0.10% by weight of the final composition).

(5) Combining the TPS-premix, SPA-premix and RSN-premix with sodium silicate (comprising 0.17% by weight of the final composition), further 20% ammonia (comprising 0.05% by weight of the final composition), ethylene glycol (comprising 7.82% by weight of the final composition), additional propylene glycol (comprising 38.71% by weight of the final composition), formalin (comprising 0.13% by weight of the final composition), PVA opacifier (comprising 0.16% by weight of the final composition), magnesium carbonate (comprising 0.5% by weight of the final composition), Zinc Stearate (comprising 1.0% by weight of the final composition), polyethylene powder<180 micron (comprising 0.2% by weight of the final composition), Xanthan gum (comprising 0.03% by weight of the final composition), and Aerosil R92 (comprising 0.001% by weight of the final composition), and high sheer mixing until a desired consistency is achieved.

Finally, it is to be understood that the foregoing description refers merely to preferred embodiments of the invention, and that variations and modifications will be possible thereto without departing from the spirit and scope of the invention.

The invention claimed is:

1. A composition for sealing punctures in pneumatic tires, said composition containing:

(a) one or more of the group consisting of propylene glycol, comprising from 10 to 90 percent by weight of the composition, propylene-ethylene glycol blend, comprising from 10 to 90 percent by weight of the composition, and water, comprising from 10 to 90 percent by weight of the composition;

(b) one or more viscosity and suspending agents selected from the group consisting of from 0.01 to 0.5 percent by weight of Xanthan gum, from 0.01 to 0.5 percent by weight of methylhydroxyethylcellulose, from 0.01 to 0.5 percent by weight of carboxymethylcellulose, from 0.05 to 1.0 percent by weight of fumed silica, and from 0.01 to 0.5 percent by weight of psyllium husk powder;

(c) one or more fillers and sealing particulates selected from the group consisting of from 0.01 to 1.0 percent by weight of fine ground rubber crumb sieved to <60 microns, from 0.01 to 1.0 percent by weight of fine ground low density polyethylene sieved to <180 microns, from 0.01 to 1.0 percent by weight of ground plastics from the group composed of nylon, polypropylene, styrene and polyethyltetrahydrophtalate, from 0.1 to 2.0 percent by weight of diatomite of <60 microns diameter, from 0.01 to 1.0 percent by weight of bentonite, from 0.01 to 1.0 percent by weight of gum resin of <60 microns diameter, from 0.05 to 1.5 percent by weight of dissolved resin, from 0.1 to 3.0 percent by weight of sodium silicate;

(d) one or more corrosion inhibitors selected from the group consisting of from 0.05 to 1.0 percent by weight of ammonium bicarbonate, from 0.05 to 1.0 percent by weight of sodium bicarbonate, and from 0.05 to 1.0 percent by weight of sodium borate;

(e) one or more polyacrylates, in an amount of from 0.05 to 2.0 percent by weight; and (f) a preservative making up the remainder of the composition.

2. A composition for use in the sealing of a damaged inflatable article, said composition including water, from 10 to 90 percent by weight;

propylene glycol, from 10 to 90 percent by weight;
a polysaccharide gum, from 0.01 to 0.3 percent by weight;
a cellulose polymer, as for example carboxymethylcellulose, from 0.01 to 0.3 percent by weight;
fumed colloidal silica, from 0.05 to 0.5 percent by weight;
ammonium bicarbonate, from 0.05 to 1 percent by weight;
borax, from 0.05 to 1.0 percent by weight; diatomite (less than 60 micron), from 0.05 to 1.0 percent by weight;
high density polyethylene/low density polyethylene powder (less than 180 micron) from 0.01 to 0.5 percent by weight;
bentonite (less than 40 micron) from 0.01 to 0.5 percent by weight;
gum resin (less than 60 micron) from 0.01 to 0.5 percent by weight;
one or more polyacrylates, in an amount of from 0.05 to 1.0 percent; and a preservative from 0.1 to 0.5 percent by weight.

3. A composition for use in sealing a punctured vehicle tire, said composition containing the following constituents (with all amounts in percentage by weight):

a hot melt pre-mix consisting making up 10.5 percent of the final composition, and consisting of the following constituents (with all amounts in percentage by weight of the pre-mix)

| | |
|---|---|
| a hydrophobic tackifying resin | 12.5 |
| rice bran | 4.0 |
| magnesium carbonate | 2.0 |
| propylene glycol | 81.5; | a gum resin pre-mix, making up 12.5 percent of the final composition, and consisting of the following components (with all amounts and percentage by weight of the pre-mix)

| | |
|---|---|
| gum resin | 12.5 |
| rice bran | 4.0 |
| magnesium carbonate | 2.0 |
| propylene glycol | 81.5; | a casein pre-mix, making up 4.25 percent of the final composition and consisting of the following components (with all amounts in percentage by weight of the pre-mix):

| | |
|---|---|
| casein | 15.0 |
| rice bran | 1.0 |
| magnesium carbonate | 0.5 |
| ethylene glycol | 79.75 |
| glycerine | 3.0 |
| skim milk powder | 0.75; | a resin soluble solution pre-mix, making up 9 percent of the final composition, and consisting of the following components (with all amounts in percentage by weight of the pre-mix)

| | |
|---|---|
| ethylene glycol | 17.5 |
| propylene glycol | 50.0 |
| water | 15.8 |
| ammonia (20 percent) | 3.5 |
| ethylalcohol | 3.5 |
| formalin | 0.2 |
| gum rosin | 9.0 |
| magnesium carbonate | 0.5; | a dilution solution pre-mix, making up 63.75 percent of the final composition, consisting of the following components (with all amounts in percentage by weight of the dilution pre-mix)

| | |
|---|---|
| propylene glycol | 4.6 |
| glycerine | 1.0 |
| ethylene glycol | 29.53 |
| water | 60.0 |
| ammonia | 0.3 |
| sodium polyacrylate | 0.3 |
| formalin | 0.3 |
| opacifier (PVA) | 0.15 |
| fluorescein | 0.02 |
| glycerine | 3.0 |
| skim milk powder | 0.75 |
| magnesium carbonate | 0.05. |

4. A process for preparing a composition for sealing punctures in pneumatic tires, said process including the steps of:
A. forming a hot phase premix by adding rosin (comprising between 0.3 and 3.0% by weight of the final composition) and propylene glycol (comprising between 0.5 and 5.0% by weight of the final composition) to a steam jacketed vessel and heating to a temperature of about 100° C. until the rosin is fully melted in the propylene glycol, followed by cooling with stirring until a temperature of about 50° C. is reached, then adding ethyl alcohol (comprising between 0.3 and 5.0% by weight of the final composition), 20% ammonia (comprising between 0.1 and 1.0% by weight of the final composition), water (comprising between 0.0 and 5.0% by weight of the final composition), polyethylene powder (from 10 micron to 180 micron in size) (comprising between 0.05 and 2.0% by weight of the final composition), magnesium carbonate (comprising between 0.1 and 2.0% by weight of the final composition) and Aerosil R972 (comprising between 0.05 and 1% by weight of the final composition) while continuing stirring;
B. forming a gel phase premix in a separate vessel by adding, with stirring, sodium polyacrylate (comprising between 0.1 and 1.5% by weight of the final composition) to water (comprising between 5 and 20% by weight of the final composition) at a temperature of about 25° C., continuing stirring for up to 6 hours, then adding with stirring propylene glycol (comprising between 0.0 and 10% by weight of the final composition), 20% ammonia (comprising between 0.05 and 0.3% by weight of the final composition) and a portion of hot phase premix formed by step A (comprising between 0.2 and 5.0% by weight of the final composition);
C. in another separate vessel adding, and mixing with stirring, water (comprising between 20 and 80% by weight of the final composition), propylene glycol (comprising between 10 and 60% by weight of the final composition), ethylene glycol (comprising between 0 and 50% by weight of the final composition, 20% ammonia (comprising between 0.05 and 0.5% by weight of the final composition), the remainder of the hot phase premix (the total hot phase premix ultimately comprising between 3.0 and 20.0% by weight of the final composition), the gel phase premix (after passing through a grinder to reduce the particle size to between 30 micron and 250 micron) (comprising between 5.0 and 20% by weight of the final composition);
then continually stirring the resultant composition for up to 24 hours with ambient temperature being reached.
5. A process for preparing a composition for sealing punctures in pneumatic tires, said process including the steps of:
A. forming a hot phase premix by adding rosin (comprising 1.5% by weight of the final composition) and propylene glycol (comprising 1.5% by weight of the final composition) to a steam jacketed vessel and heating to a temperature of about 100° C. until the rosin is fully melted in the propylene glycol, followed by cooling with stirring until a temperature of about 50° C. is reached, then adding ethyl alcohol (comprising 1.0% by weight of the final composition), 20% ammonia (comprising 0.4% by weight of the final composition), water (comprising 0.7% by weight of the final composition), polyethylene powder (from 10 micron to 180 micron in size) (comprising 1.0% by weight of the final composition), Magnesium Carbonate (comprising 0.5% by weight of the final composition), and zinc stearate (comprising 1.0% by weight of the final composition) while continuing stirring;
B. forming a gel phase premix in a separate vessel by adding, with stirring, sodium polyacrylate (comprising 0.3% by weight of the final composition) to water (comprising 11.43% by weight of the final composition) at a temperature of about 25° C., continuing stirring for up to 6 hours, then adding with stirring propylene glycol (comprising 3.5% by weight of the final composition), 20% ammonia (comprising 0.15% by weight of the final composition) and a portion of hot phase premix formed by step A (comprising 0.5% by weight of the final composition);

C. in another separate vessel adding, and mixing with stirring, water (comprising 33.2% by weight of the final composition), propylene glycol (comprising 33% by weight of the final composition), ethylene glycol (comprising 10% by weight of the final composition), 20% ammonia (comprising 0.2% by weight of the final composition), the remainder of the hot phase premix (the total hot phase premix ultimately comprising 7.1% by weight of the final composition), the gel phase premix (after passing through a grinder to reduce the particle size to between 30 micron and 250 micron) (comprising 16% by weight of the final composition);

then continually stirring the resultant composition for up to 24 hours with ambient temperature being reached.

6. A process for preparing a composition for sealing punctures in pneumatic tires, said process including the steps of:

(1) Forming a TPS (Tapioca Solution)-premix by dispersing tapioca starch (comprising 0.16% by weight of the final composition), in propylene glycol (comprising 1.29% by weight of the final composition), and water (comprising 1.13% by weight of the final composition), while stirring and heating to 80° C. until a solution becomes clear;

(2) Forming an SPA (Sodium Poly Acrylate)-premix by adding sodium polyacrylate (comprising 0.19% by weigh of the final composition) to water (comprising 10.34% by weight of the final composition) in a vessel at 25° C. and stirring for six hours, thereafter adding propylene glycol (comprising 2.52% by weight of the final composition), 20% ammonia (comprising 0.06% by weight of the final composition), and rosin solution (comprising 0.76% by weight of the final composition) and circulating for 24 hours through a high shear pump to reduce the sodium polyacrylate particle size down to between 25 micrometers and 250 micrometers;

(3) Forming a CSN (Casein)-premix by adding casine (comprising 0.27% by weight of the final composition) in a separate vessel to alcohol (comprising 0.22% by weight of the final composition), propylene glycol (comprising 0.22% by weight of the final composition), 20% ammonia (comprising 0.03% by weight of the final composition), and water (comprising 0.04% by weight of the final composition), and circulating the resulting mixture through a high shear pump until the premix/solution becomes smooth and viscous;

4) Forming an RSN (Rosin)-premix by adding, to a steam jacketed vessel, rosin (comprising 1.09% by weight of the final composition), and propylene glycol (comprising 1.09% by weight of the final composition), and heating the mixture to 100° C., and after the rosin is fully melted, stirring the mixture until cooled to 55° C., and then adding alcohol (0.12% by weight of the final composition), 20% ammonia (0.25% by weight of the final composition), CSN-premix (comprising 0.26% by weight of the final composition), and water (comprising 0.10% by weight of the final composition);

5) Combining the TPS-premix, SPA-premix and RSN-premix with sodium silicate (comprising 0.17% by weight of the final composition), further 20% ammonia (comprising 0.05% by weight of the final composition), ethylene glycol (comprising 7.82% by weight of the final composition), additional propylene glycol (comprising 38.71% by weight of the final composition), formalin (comprising 0.13% by weight of the final composition), PVA opacifier (comprising 0.16% by weight of the final composition), magnesium carbonate (comprising 0.5% by weight of the final composition), Zinc Stearate (comprising 1.0% by weight of the final composition), polyethylene powder<180 micron (comprising 0.2% by weight of the final composition), Xanthan gum (comprising 0.03% by weight of the final composition), and Aerosil R92 (comprising 0.001% by weight of the final composition), and high sheer mixing until a desired consistency is achieved.

* * * * *